United States Patent
Zou

(10) Patent No.: US 10,416,463 B2
(45) Date of Patent: Sep. 17, 2019

(54) PROJECTING UNIT AND PROJECTING DEVICE USING THE SAME

(71) Applicants: Inventec Appliances (Pudong) Corporation, Shanghai (CN); Inventec Appliances Corp., New Taipei (TW); Inventec Appliances (JiangNing) Corporation, Nanjing (CN)

(72) Inventor: Zheng-Rong Zou, Nanjing (CN)

(73) Assignees: Inventec Appliances (Pudong) Corporation, Shanghai (CN); Inventec Appliances Corp., New Taipei (TW); Inventec Appliances (JiangNing) Corporation, Nanjing (CN)

( * ) Notice: Subject to any disclaimer, the term of this patent is extended or adjusted under 35 U.S.C. 154(b) by 99 days.

(21) Appl. No.: 15/675,788

(22) Filed: Aug. 13, 2017

(65) Prior Publication Data

US 2018/0196270 A1    Jul. 12, 2018

(30) Foreign Application Priority Data

Jan. 11, 2017  (CN) .......................... 2017 1 0020089

(51) Int. Cl.
*G02B 7/00* (2006.01)
*G02B 27/09* (2006.01)
*G02B 13/06* (2006.01)
*G02B 27/10* (2006.01)
*G03B 21/00* (2006.01)
(Continued)

(52) U.S. Cl.
CPC .......... *G02B 27/0961* (2013.01); *G02B 13/06* (2013.01); *G02B 27/0972* (2013.01); *G02B 27/0988* (2013.01); *G02B 27/108* (2013.01);

*G03B 21/008* (2013.01); *G03B 21/28* (2013.01); *G03B 37/04* (2013.01)

(58) Field of Classification Search
CPC  G02B 27/0961; G02B 13/06; G02B 27/0972; G02B 27/0988; G02B 27/108; G03B 21/00
USPC ......................................................... 359/504
See application file for complete search history.

(56) References Cited

U.S. PATENT DOCUMENTS 8,439,508 B2 *  5/2013  Matsuo ................. G03B 37/04
345/1.3

FOREIGN PATENT DOCUMENTS

CN  103713451 A  4/2014
CN  203691522 U  7/2014
(Continued)

*Primary Examiner* — Euncha P Cherry
(74) *Attorney, Agent, or Firm* — CKC & Partners Co., LLC

(57) ABSTRACT

A projecting unit includes a first light-source unit, a first digital micro-mirror unit, a second light-source unit, a second digital micro-mirror unit, a first prism, a first wide-angle lens, and a second wide-angle lens. The first light-source unit is configured to provide a first light beam. The first digital micro-mirror unit is configured to receive the first light beam and transform the first light beam into a first image signal. The second light-source unit is configured to provide a second light beam. The second digital micro-mirror unit is configured to receive the second light beam and transform the second light beam into a second image signal. The first prism is configured to receive and reflect the first and second image signals. The first wide-angle lens and the second wide-angle lens are configured to receive and project the first and second image signals reflected from the first prism respectively.

20 Claims, 6 Drawing Sheets

(51) Int. Cl.
    *G03B 21/28*    (2006.01)
    *G03B 37/04*    (2006.01)

(56) References Cited

FOREIGN PATENT DOCUMENTS

| CN | 104880805 A | 9/2015 |
|---|---|---|
| TW | 576609 | 2/2004 |
| TW | 200622468 A | 7/2006 |

* cited by examiner

PROJECTING UNIT AND PROJECTING DEVICE USING THE SAME

RELATED APPLICATIONS

This application claims priority to China Application Serial Number 201710020089.1, filed Jan. 11, 2017, which is herein incorporated by reference.

BACKGROUND

Technical Field

The present disclosure relates to a projecting unit and a projecting device using the same.

Description of Related Art

In recent years, optical projectors have been applied in various fields. The optical projectors have served on an expanded range of purposes, for example, from consumer products to high-tech devices. Some kinds of optical projectors are widely used in schools, household and commerce in order to amplify image signals provided by an image signal source and then display on a projection screen. However, with requirements of users, projecting mode of the optical projector is varied. For example, in addition to displaying images, the optical projector can further provide a user with an experience of panoramic virtual reality in viewing angle of 360 degrees. Regarding to the projecting mode in viewing angle of 360 degrees, a plurality of optical projectors connected together are used to achieve. Therefore, cost of the set of the optical projectors that can provide a panoramic image in viewing angle of 360 degrees increases, such that the set of the optical projectors is hard to be popularized in consumer market.

SUMMARY

An aspect of the present disclosure provides a projecting device includes a projecting unit and a processing unit, in which the projecting unit can project images forward and backward. With the projecting unit and the processing unit, the projecting device can simultaneously project a first image signal and a second image signal, in which the first image signal and the second image signal are projected forward and backward respectively. In other words, optical paths of the first image signal projected forward and the second image signal projected backward are integrated into the same projecting device, and thus the projecting device can provide the panoramic image through the single projecting unit.

An aspect of the present disclosure provides a projecting unit including a first light-source unit, a first digital micro-mirror unit, a second light-source unit, a second digital micro-mirror unit, a first prism, a first wide-angle lens, and a second wide-angle lens. The first light-source unit is configured to provide a first light beam. The first digital micro-mirror unit is configured to receive the first light beam and transform the first light beam into a first image signal. The second light-source unit is configured to provide a second light beam. The second digital micro-mirror unit is configured to receive the second light beam and transform the second light beam into a second image signal. The first prism is configured to receive and reflect the first and second image signals, in which traveling directions of the reflected first and second image signals are opposite to each other. The first wide-angle lens is configured to receive and project the first image signal reflected from the first prism. The second wide-angle lens is configured to receive and project the second image signal reflected from the first prism.

An aspect of the present disclosure provides a projecting device including a shell body, a projecting unit, and a processing unit. The shell body has a front sidewall and a rear sidewall, in which the front sidewall and the rear sidewall are parallel with each other, and the front sidewall and the rear sidewall respectively have a first opening and a second opening. The projecting unit is disposed in the shell body and between the front sidewall and the rear sidewall. A first wide-angle lens of the projecting unit projects a first image signal through the first opening. A second wide-angle lens of the projecting unit projects a second image signal through the second opening. A first digital micro-mirror unit of the projecting unit includes a first circuit board. A second digital micro-mirror unit of the projecting unit includes a second circuit board. The processing unit is disposed in the shell body and electrically coupled with the first circuit board and the second circuit board, in which the processing unit is configured to control the first digital micro-mirror unit and the second digital micro-mirror unit through the first circuit board and the second circuit board respectively.

DETAILED DESCRIPTION

Figure 1:
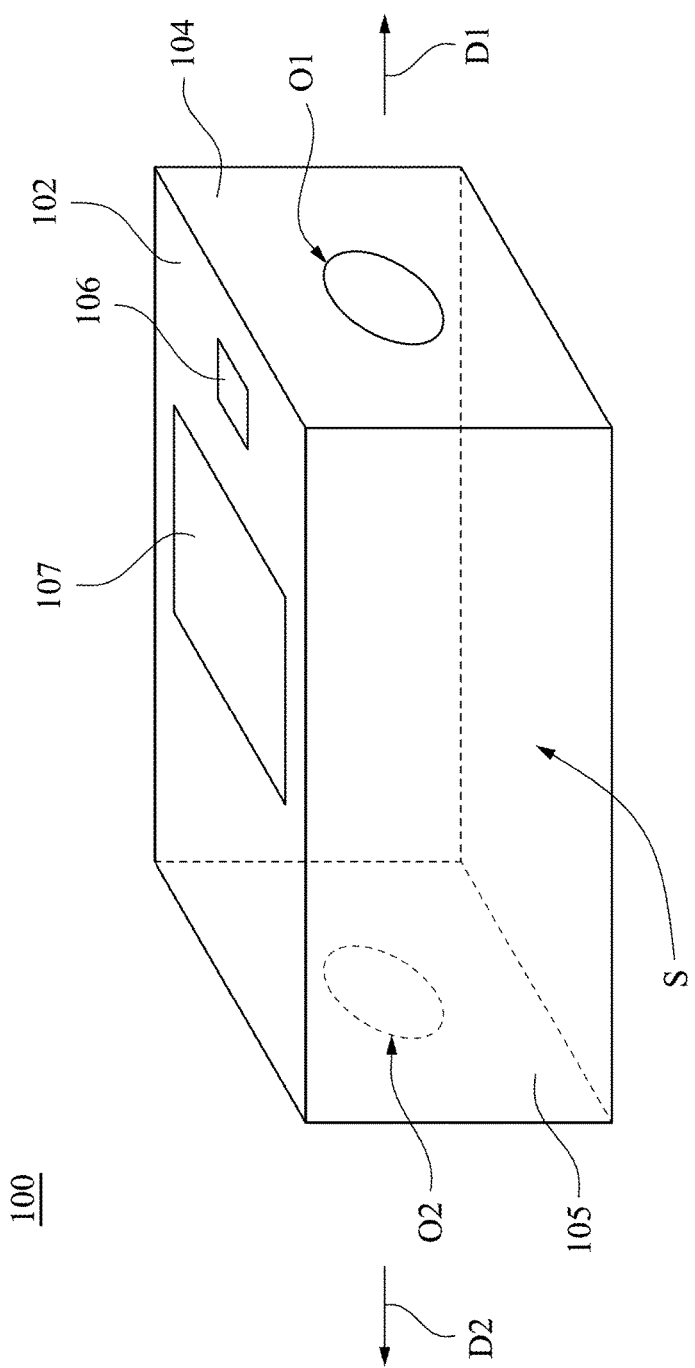
FIG. 1 is a schematic perspective view of a projecting device according to some embodiments of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

It will be understood that, although the terms first, second, third etc. may be used herein to describe various elements, components, regions, layers and/or sections, these elements, components, regions, layers and/or sections should not be limited by these terms. Thus, a first element, component, region, layer or section discussed below could be termed a second element, component, region, layer or section without departing from the teachings of the present disclosure.

Figure 2:
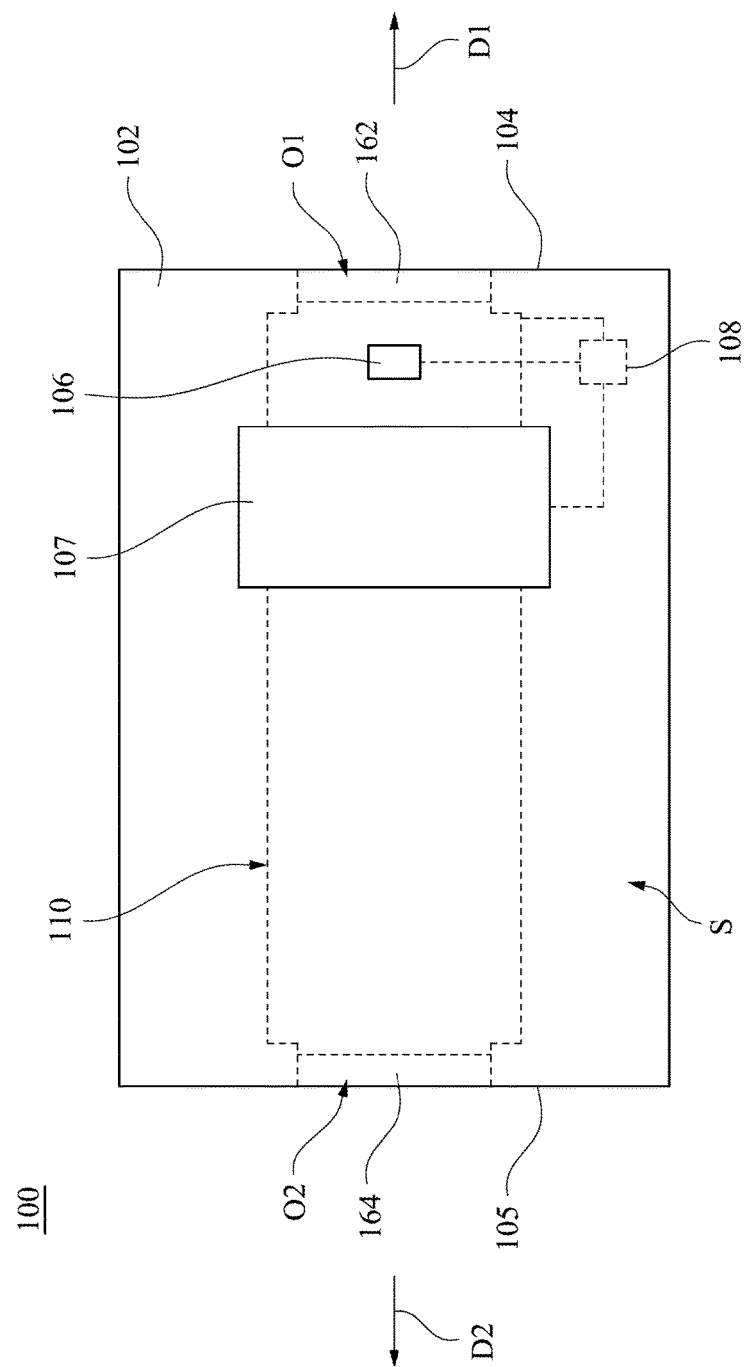
FIG. 2 is a schematic top view of the projecting device of FIG. 1 according to some embodiments of the present disclosure.

Reference is made to FIG. 1, in which, FIG. 1 is a schematic perspective view of a projecting device 100 according to some embodiments of the present disclosure and FIG. 2 is a schematic top view of the projecting device 100 of FIG. 1 according to some embodiments of the present disclosure. The projecting device 100 can provide images toward a forward direction and a backward direction thereof, in which the forward direction and the backward direction of the projecting device 100 are shown as a first direction D1 and a second direction D2 respectively, thereby providing an observer with a panoramic image and an experience with respect to virtual reality. The projecting device 100 includes a shell body 102, a function unit 106, an expansion interface 107, a processing unit 108, and a projecting unit 110. In addition, in order to make FIG. 1 succinct, the processing unit 108, and the projecting unit 110 which illustrated in FIG. 2 are not shown in FIG. 1.

The shell body 102 has a front sidewall 104 and a rear sidewall 105, in which the front sidewall 104 and the rear sidewall 105 are parallel with each other. The front sidewall 104 and the rear sidewall 105 can define an accommodation space S therebetween. In addition, the front sidewall 104 and the rear sidewall 105 respectively have a first opening O1 and a second opening O2, and the first opening O1 and the second opening O2 communicate with the accommodation space S.

Figure 3:
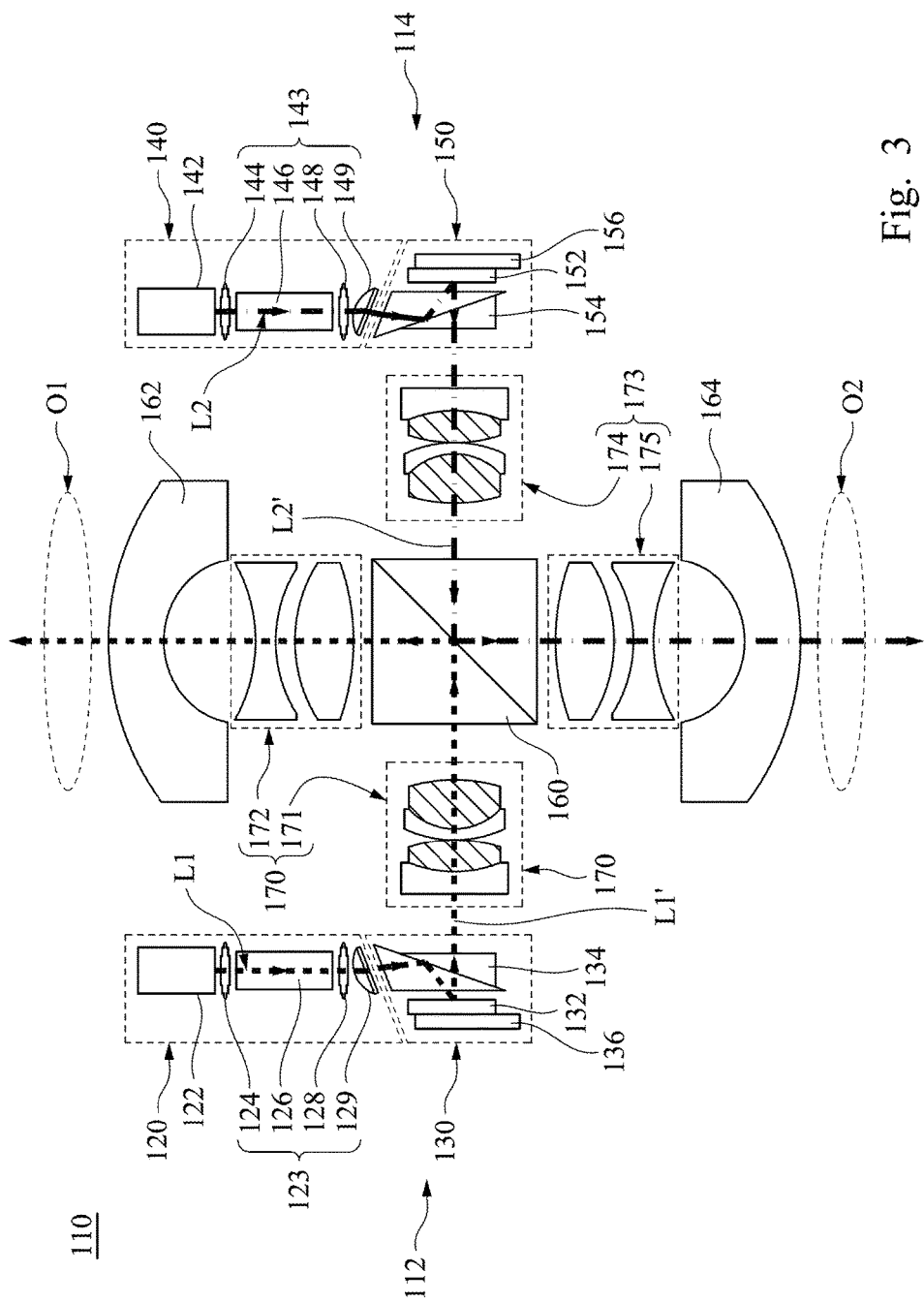
FIG. 3 is a schematic diagram of a configuration of the projecting unit of FIG. 2.

The following descriptions are provided with respect to a configuration of the processing unit 108 and the projecting unit 110. Reference is made to FIGS. 2 and 3, in which FIG. 3 is a schematic diagram of a configuration of the projecting unit 110 of FIG. 2. As shown in FIGS. 2 and 3, the processing unit 108 and the projecting unit 110 are disposed in the accommodation space S of the shell body 102 and between the front sidewall 104 and the rear sidewall 105. The processing unit 108 is electrically connected to the projecting unit 110. For example, the processing unit 108 can be electrically connected to some elements of the projecting unit 110. The projecting unit 110 includes a front projecting set 112, a rear projection set 114, and a first prism 160, in which the front projecting set 112 and the rear projection set 114 are respectively configured to project images through the first opening O1 and the second opening O2 of the shell body 102. The front projecting set 112 includes a first light-source unit 120, a first digital micro-mirror unit 130, a first wide-angle lens 162, and a first lens unit 170. The rear projection set 114 includes a second light-source unit 140, a second digital micro-mirror unit 150, a second wide-angle lens 164, and a second lens unit 173.

The first light-source unit 120 includes a first light source 122 and a first light-guiding unit 123, in which the first light-guiding unit 123 includes a first light-converging lens 124, a first light-receiving element 126, a second light-converging unit 128, and a third light-converging unit 129. The first light source 122 includes at least one light-emitting diode (LED) therein and is configured to provide a first light beam L1, in which the first light source 122 is a three-primary-colors light source. The first light beam L1 emitted from the first light source 122 can pass through the first light-converging lens 124, the first light-receiving element 126, the second light-converging unit 128, and the third light-converging unit 129 in sequence. The first light beam L1 can be collected by a combination of the first light-converging lens 124, the first light-receiving element 126, the second light-converging unit 128, and the third light-converging unit 129, such that the first light beam L1 can enter the first digital micro-mirror unit 130.

The first digital micro-mirror unit 130 includes a first digital micro-mirror device (DMD) 132, a second prism 134, and a first circuit board 136. The first circuit board 136 is electrically connected to the processing unit 108 and the first DMD 132, in which the processing unit 108 can control the first digital micro-mirror unit 130 through the first circuit board 136. The second prism 134 can be a total internal reflection (TIR) prism having a TIR interface. The second prism 134 can be configured to receive the first light beam L1 propagated from the first light-source unit 120, such that the first light beam L1 can be reflected from the second prism 134 to the first DMD 132 through the TIR interface. The first DMD 132 can be controlled and driven by the processing unit 108 to transform the first light beam L1 into a first image signal L1', in which the first image signal L1' may be a multicolored image signal. Then, the first image signal L1' is emitted from the first DMD 132 to the second prism 134, and the first image signal L1' passing through the second prism 134 travels toward the first prism 160. Furthermore, a traveling direction of the first light beam L1 emitted from the first light source 122 is substantially orthogonal to a traveling direction of the first image signal L1' passing through the second prism 134.

The first prism 160 may be a right angle prism having a TIR interface. The first prism 160 can be configured to receive the first image signal L1' and reflect the first image signal L1' to the first wide-angle lens 162. In addition, the first lens unit 170 is optically coupled between the first digital micro-mirror unit 130 and the first wide-angle lens 162, and the first lens unit 170 includes a first lens set 171 and a second lens set 172. The first lens set 171 is optically coupled between the first digital micro-mirror unit 130 and the first prism 160, in which the first lens set 171 is configured to collect and align the first image signal L1' propagated from the first digital micro-mirror unit 130 to the first prism 160. The second lens set 172 is optically coupled between the first prism 160 and the first wide-angle lens 162, in which the second lens set 172 is configured to collect and align the first image signal L1' propagated from first prism 160 to the first wide-angle lens 162.

The first wide-angle lens 162 is configured to receive the first image signal L1' reflected from the first prism 160 and project the first image signal L1' in wide angle. The first wide-angle lens 162 can be disposed to be adjacent to the front sidewall 104 of the shell body 102, as shown in FIG. 2. Furthermore, the first wide-angle lens 162 can project the first image signal L1' toward the front of the projecting device 100 through the first opening O1.

The second light-source unit 140 includes a second light source 142 and a second light-guiding unit 143, in which the second light-guiding unit 143 includes a fourth light-converging lens 144, a second light-receiving element 146, a fifth light-converging unit 148, and a sixth light-converging unit 149. The second light source 142 includes at least one LED therein and in configured to provide a second light beam L2, in which the second light source 142 is a three-primary-colors light source. The first light beam L2 emitted from the second light source 142 can pass through the fourth light-converging lens 144, the second light-receiving element 146, the fifth light-converging unit 148, and the sixth light-converging unit 149 in sequence. The second light beam L2 can be collected by a combination of the fourth light-converging lens 144, the second light-receiving element 146, the fifth light-converging unit 148, and the sixth light-converging unit 149, such that the second light beam L2 can enter the second digital micro-mirror unit 150.

The second digital micro-mirror unit 150 includes a second DMD 152, a third prism 154, and a second circuit board 156. The second circuit board 156 is electrically connected to the processing unit 108 and the second DMD 152, in which the processing unit 108 can control the second digital micro-mirror unit 150 through the second circuit board 156. The third prism 154 can be a TIR prism having a TIR interface. The third prism 154 can be configured to receive the second light beam L2 propagated from the second light-source unit 140, such that the second light beam L2 can be reflected from the third prism 154 to the second DMD 152 through the TIR interface. The second DMD 152 can be controlled and driven by the processing unit 108 to transform the second light beam L2 into a second image signal L2', in which the second image signal L2' may be a multicolored image signal. Furthermore, in order to make FIG. 3 succinct, the type of line illustrating the first light beam L1 and the first image signal L1' is different from the type of line illustrating the second light beam L2 and the second image signal L2'. Then, the second image signal L2' is emitted from the second DMD 152 to the third prism 154, and the second image signal L2' passing through the third prism 154 travels toward the first prism 160. Furthermore, a traveling direction of the second light beam L2 emitted from the second light source 142 is substantially orthogonal to a traveling direction of the second image signal L2' passing through the third prism 154.

The first prism 160 can be configured to receive the second image signal L2' and reflect the second image signal L2' to the second wide-angle lens 164. That is, the first image signal L1' and the second image signal L2' are reflected to the first wide-angle lens 162 and the second wide-angle lens 164 respectively from the same prism, in which the traveling directions of the first image signal L1' and the second image signal L2' are opposite to each other after the reflection of the first prism 160. With this configuration, the elements of the projecting unit 110 can be arranged closely, thereby reducing the volume of the projecting unit 110. In addition, the second lens unit 173 is optically coupled between the second digital micro-mirror unit 150 and the second wide-angle lens 164, and the second lens unit 173 includes a third lens set 174 and a fourth lens set 175. Similarly to the first lens unit 170, the third lens set 174 and the fourth lens set 175 of the second lens unit 173 can collect and align the second image signal L2'.

The second wide-angle lens 164 is configured to receive the second image signal L2' reflected from the first prism 160 and project the second image signal L2' in wide angle. The second wide-angle lens 164 can be disposed to be adjacent to the rear sidewall 105 of the shell body 102, as shown in FIG. 2. Furthermore, the second wide-angle lens 164 can project the second image signal L2' toward the back of the projecting device 100 through the second opening O2.

Figure 4:
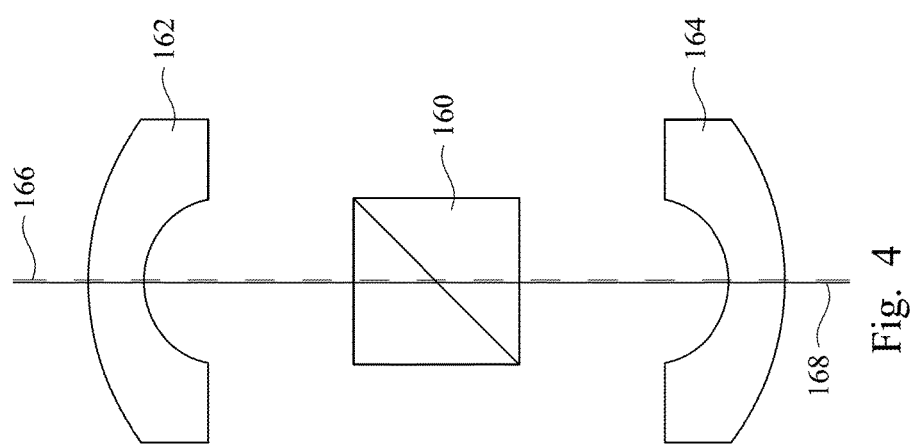
FIG. 4 is a schematic diagram of a configuration of the first prism, the first wide-angle lens, and the second wide-angle lens of FIG. 3.

FIG. 4 is a schematic diagram of a configuration of the first prism 160, the first wide-angle lens 162, and the second wide-angle lens 164 of FIG. 3. Reference is made to FIGS. 3 and 4.

The first wide-angle lens 162 and the second wide-angle lens 164 have optical axes 166 and 168 respectively. The optical axes 166 and 168 of the first wide-angle lens 162 and the second wide-angle lens 164 penetrate the TIR interface of the first prism 160, and the optical axis 166 of the first wide-angle lens 162 coincides with the optical axis 168 of the second wide-angle lens 164. Moreover, the first wide-angle lens 162 and the second wide-angle lens 164 are disposed to be symmetrical about the first prism 160, but the projecting device 100 of the present disclosure is not limited thereto.

Each of the first wide-angle lens 162 and the second wide-angle lens 164 may be a fisheye lens, and each of the first wide-angle lens 162 and the second wide-angle lens 164 has a viewing angle $\theta$, in which $180° \leq \theta$. In other embodiments, the viewing angle $\theta$ of each of the first wide-angle lens 162 and the second wide-angle lens 164 may be in a range from 170° to 230°. With this configuration, since the optical axis 166 of the first wide-angle lens 162 coincides with the optical axis 168 of the second wide-angle lens 164 and the first wide-angle lens 162 and the second wide-angle lens 164 are disposed to be symmetrical about the first prism 160, projecting areas of the first image signal L1' and the second image signal L2' are symmetrical about the location of the projecting device 100, as shown in FIG. 5, which is a schematic vertical view of a projecting area provided by the projecting device 100 of FIG. 1.

Figure 5:
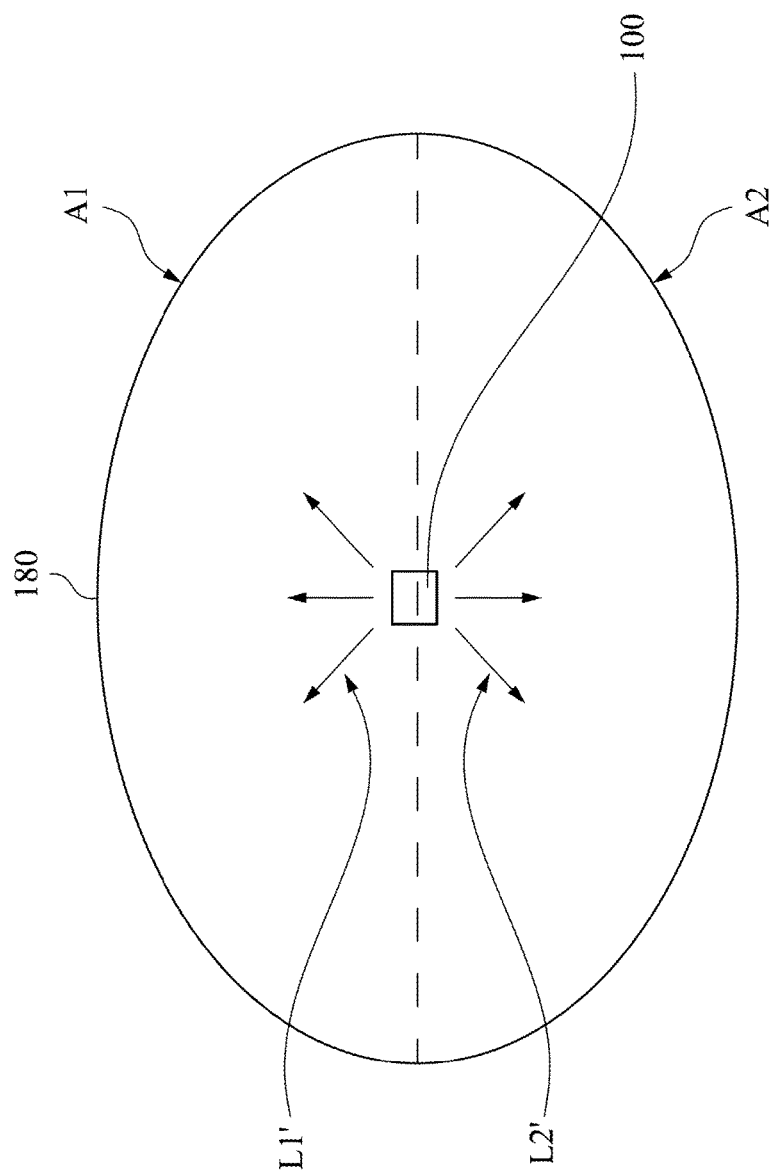
FIG. 5 is a schematic vertical view of a projecting area provided by the projecting device of FIGS. 1.

As shown in FIG. 5, the projecting device 100 can project an image toward a screen 180 having zones A1 and A2, and the zones A1 and A2 are respectively present the front and the back of the projecting device 100. The projecting device 100 can project the first image signal L1' on the zone A1, in which the first image signal L1' is projected in the wide angle through the first wide-angle lens 162 (see FIGS. 2 and 3). Similarly, the projecting device 100 can project the second image signal L2' on the zone A2, in which the second image signal L2' is projected in the wide angle through the second wide-angle lens 164 (see FIGS. 2 and 3). Then, image are formed by the first image signal L1' and the second image signal L2' at the zones A1 and A2 respectively. With the image formed by the first image signal L1' and the second image signal L2' at the zones A1 and A2, a panoramic image is shown on the screen 180, such that an observer can obtain an experience of panoramic virtual reality.

Reference is made back to FIGS. 2 and 3. The function unit 106 and the expansion interface 107 are disposed at the shell body 102 and electrically coupled with the processing unit 108. The function unit 106 is configured to drive the projecting unit 110 through the processing unit 108. For example, when an observer choose an image, the observer can push the function unit 106. Then, the processing unit 108 can drive the first DMD 132 and the second DMD 152 through the first circuit board 136 and the second circuit board 156 respectively, such that the projecting unit 110 can simultaneously project the first image signal L1' and the second image signal L2'. That is, the projecting unit that can project image signals toward forward and backward is controlled by the single processing unit (e.g., the processing unit 108). The expansion interface 107 includes at least one of a keyboard, an infrared receiver, an audio module, an universal serial bus (USB), or combinations thereof. In some embodiments, the expansion interface 107 may be a keyboard which can provide an observe with an operating interface. In some embodiments, the expansion interface 107 may be a USB, such that an observer can input data through the USB. In some embodiments, the expansion interface 107 may be an element that can improve the operability of the projecting device 100.

Figure 6:
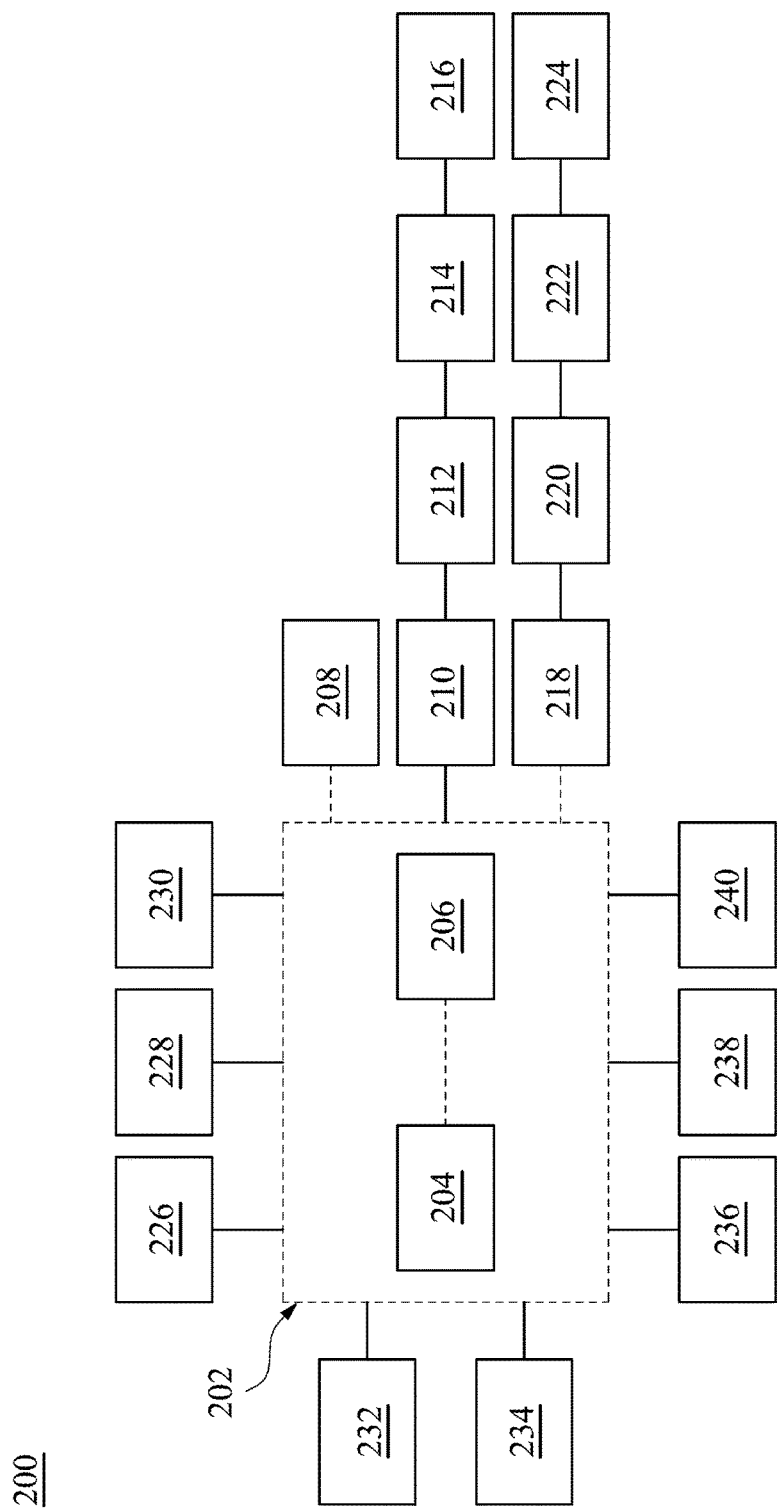
FIG. 6 is a block diagram of the functional members of the projecting device according to some embodiments of the present disclosure.

For example, the functional members of the projecting device can be shown in FIG. 6, in which FIG. 6 is a block diagram of the functional members of the projecting device 200 according to some embodiments of the present disclosure. As shown in FIG. 6, the elements of the projecting device 200 are shown as the blocks. The projecting device 200 includes a processing unit 202, a light-source-driving unit 208, a first image processor 210, a first interface 212, a front digital light processor (DLP) 214, a first digital micro-mirror unit 216, a second image processor 218, a second interface 220, a rear DLP 222, a second digital micro-mirror unit 224, a power unit 226, a USB 228, an input device 230, a wireless communicating unit 232, an audio unit 234, a memory unit 236, a memory card interface 238, and an infrared-receiving interface 240.

The processing unit 202 includes a central processing unit (CPU) 204 and a graphics processing unit (GPU) 206. The projecting device 200 can perform main calculation through the CPU 204. The GPU 206 is electrically connected to the CPU 204 and configured to perform integrating images to form a panoramic image, and then the panoramic image is divided into a front image and a rear image. The light-source-driving unit 208, the first image processor 210, and the second image processor 218 are electrically connected to the processing unit 202, in which the light-source-driving unit 208 is configured to drive a light source disposed in the projecting device 200 to generate a light beam.

The first image processor 210, the first interface 212, the front DLP 214, and the first digital micro-mirror unit 216 are connected in series. The first image processor 210 is configured to calculate parameters of the images transmitted from the GPU 206, so as to define frame per second (FPS) of the images. The first interface 212 is configured to serve as an interface between the first image processor 210 and the front DLP 214. The front DLP 214 is configured to drive the first digital micro-mirror unit 216, so as to make the projecting device 200 project the image forward. The second image processor 218, the second interface 220, the rear DLP 222, and the second digital micro-mirror unit 224 are connected in series. Functions of the second image processor 218 and the second interface 220 are similar to that of the first image processor 210 and the first interface 212, and they are not repeated herein. The rear DLP 222 is configured to drive the second digital micro-mirror unit 224, so as to make the projecting device 200 project the image backward.

In addition, the power unit 226, the USB 228, the input device 230, the wireless communicating unit 232, the audio unit 234, the memory unit 236, the memory card interface 238, and the infrared-receiving interface 240 can be add-on members which can be selectively disposed in the projecting device 200. The power unit 226 can serves as a power source of the projecting device 200. The USB 228 can connected with an external device. The input device 230 can be used for operating the projecting device 200. The wireless communicating unit 232 can make the projecting device 200 communicate with an external device in wireless. The audio unit 234 can provide sound effects. The memory unit 236 can be used for saving and loading information of images. The memory card interface 238 can be used for loading an external memory card. The infrared-receiving interface 240 can make the projecting device 200 communicate with an external device in infrared communication.

In sum, the projecting device includes the projecting unit and the processing unit, in which the projecting unit can project images forward and backward. With the projecting unit and the processing unit, the projecting device can simultaneously project the first image signal and the second image signal, in which the first image signal and the second image signal are projected forward and backward respectively. In other words, optical paths of the first image signal projected forward and the second image signal projected backward are integrated into the same projecting device, and thus the projecting device can provide the panoramic image through the single projecting unit. Furthermore, with the arrangement that the two image signals are integrated into the projecting device, the elements of the projecting unit can be arranged closely, thereby reducing the volume of the projecting unit.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of present disclosure provided they fall within the scope of the following claims.

What is claimed is:

1. A projecting unit comprising:
    a first light-source unit configured to provide a first light beam;
    a first digital micro-mirror unit configured to receive the first light beam and transform the first light beam into a first image signal;
    a second light-source unit configured to provide a second light beam;
    a second digital micro-mirror unit configured to receive the second light beam and transform the second light beam into a second image signal;
    a first prism configured to receive and reflect the first and second image signals, wherein traveling directions of the reflected first and second image signals are opposite to each other;
    a first wide-angle lens configured to receive and project the first image signal reflected from the first prism; and
    a second wide-angle lens configured to receive and project the second image signal reflected from the first prism, wherein the first image signal and the second image signal are projected to travel away from each other by the first wide-angle lens and the second wide-angle lens respectively.

2. The projecting unit of claim 1, wherein an optical axis of the first wide-angle lens coincides with an optical axis of the second wide-angle lens.

3. The projecting unit of claim 2, wherein the first wide-angle lens and the second wide-angle lens are disposed to be symmetrical about the first prism.

4. The projecting unit of claim 3, wherein the first prism has a total internal reflection (TIR) interface, and the optical axes of the first wide-angle lens and the second wide-angle lens penetrate the TIR interface of the first prism.

5. The projecting unit of claim 3, further comprising:
    a first lens unit optically coupled between the first digital micro-mirror unit and the first wide-angle lens and configured to guide and align the first image signal; and
    a second lens unit optically coupled between the second digital micro-mirror unit and the second wide-angle lens and configured to guide and align the second image signal.

6. The projecting unit of claim 1, wherein each of the first wide-angle lens and the second wide-angle lens has a viewing angle $\theta$, and $180° \leq \theta$.

7. The projecting unit of claim 1, wherein the first light-source unit comprises:
    a first light source configured to provide the first light beam; and
    a first light-guiding unit configured to guide the first light beam to the first digital micro-mirror unit;
    wherein the second light-source unit comprises:
    a second light source configured to provide the second light beam; and
    a second light-guiding unit configured to guide the second light beam to the second digital micro-mirror unit.

8. The projecting unit of claim 7, wherein each of the first light source and the second light source comprise at least one light-emitting diode.

9. The projecting unit of claim 7, wherein the first digital micro-mirror unit comprises:
   a first digital micro-mirror device (DMD) configured to transform the first light beam into the first image signal; and
   a second prism configured to reflect the first light beam and to allow the first image signal to pass therethrough, wherein a traveling direction of the first light beam emitted from the first light source is substantially orthogonal to the traveling direction of the first image signal passing through the second prism;
   wherein the second digital micro-mirror unit comprises:
   a second DMD configured to transform the second light beam into the second image signal; and
   a third prism configured to reflect the second light beam and to allow the second image signal to pass therethrough, wherein a traveling direction of the second light beam emitted from the second light source is substantially orthogonal to the traveling direction of the second image signal passing through the third prism.

10. A projecting device comprising:
   a shell body having a front sidewall and a rear sidewall, wherein the front sidewall and the rear sidewall are parallel with each other, and the front sidewall and the rear sidewall respectively have a first opening and a second opening;
   a projecting unit disposed in the shell body and between the front sidewall and the rear sidewall, wherein the projecting unit comprises:
   a first light-source unit configured to provide a first light beam;
   a first digital micro-mirror unit configured to receive the first light beam and transform the first light beam into a first image signal, wherein the first digital micro-mirror unit comprises a first circuit board;
   a second light-source unit configured to provide a second light beam;
   a second digital micro-mirror unit configured to receive the second light beam and transform the second light beam into a second image signal, wherein the second digital micro-mirror unit comprises a second circuit board;
   a first prism configured to receive and reflect the first and second image signals, wherein traveling directions of the reflected first and second image signals are opposite to each other;
   a first wide-angle lens configured to receive and project the first image signal reflected from the first prism, wherein the first wide-angle lens projects the first image signal through the first opening; and
   a second wide-angle lens configured to receive and project the second image signal reflected from the first prism, wherein the second wide-angle lens projects the second image signal through the second opening; and
   a processing unit disposed in the shell body and electrically coupled with the first circuit board and the second circuit board, wherein the processing unit is configured to control the first digital micro-mirror unit and the second digital micro-mirror unit through the first circuit board and the second circuit board respectively.

11. The projecting device of claim 10, further comprising:
   a function unit disposed at the shell body and electrically coupled with the processing unit, wherein the function unit is configured to drive the projecting unit through the processing unit, so as to allow the projecting unit to simultaneously project the first image signal and the second image signal.

12. The projecting device of claim 10, further comprising:
   an expansion interface disposed at the shell body and electrically coupled with the processing unit, wherein the expansion interface comprises a keyboard, an infrared receiver, an audio module, an universal serial bus (USB), or combinations thereof.

13. The projecting device of claim 10, wherein an optical axis of the first wide-angle lens coincides with an optical axis of the second wide-angle lens.

14. The projecting device of claim 13, wherein the first wide-angle lens and the second wide-angle lens are disposed to be symmetrical about the first prism.

15. The projecting device of claim 14, wherein the first prism has a total internal reflection (TIR) interface, and the optical axes of the first wide-angle lens and the second wide-angle lens penetrate the TIR interface of the first prism.

16. The projecting device of claim 14, further comprising:
   a first lens unit optically coupled between the first digital micro-mirror unit and the first wide-angle lens and configured to guide and align the first image signal; and
   a second lens unit optically coupled between the second digital micro-mirror unit and the second wide-angle lens and configured to guide and align the second image signal.

17. The projecting device of claim 10, wherein each of the first wide-angle lens and the second wide-angle lens has a viewing angle θ, and 180°≤θ.

18. The projecting device of claim 10, wherein the first light-source unit comprises:
   a first light source configured to provide the first light beam; and
   a first light-guiding unit configured to guide the first light beam to the first digital micro-mirror unit;
   wherein the second light-source unit comprises:
   a second light source configured to provide the second light beam; and
   a second light-guiding unit configured to guide the second light beam to the second digital micro-mirror unit.

19. The projecting device of claim 18, wherein each of the first light source and the second light source comprise at least one light-emitting diode.

20. The projecting device of claim 18, wherein the first digital micro-mirror unit comprises:
   a first digital micro-mirror device (DMD) configured to transform the first light beam into the first image signal; and
   a second prism configured to reflect the first light beam and to allow the first image signal to pass therethrough, wherein a traveling direction of the first light beam emitted from the first light source is substantially orthogonal to the traveling direction of the first image signal passing through the second prism;
   wherein the second digital micro-mirror unit comprises:
   a second DMD configured to transform the second light beam into the second image signal; and
   a third prism configured to reflect the second light beam and to allow the second image signal to pass therethrough, wherein a traveling direction of the second light beam emitted from the second light source is substantially orthogonal to the traveling direction of the second image signal passing through the third prism.

* * * * *